US010090948B2

(12) United States Patent
Fischer et al.

(10) Patent No.: US 10,090,948 B2
(45) Date of Patent: Oct. 2, 2018

(54) REQUEST TO SEND (RTS) TO GROUP WITHIN WIRELESS COMMUNICATIONS

(71) Applicant: BROADCOM CORPORATION, Irvine, CA (US)

(72) Inventors: Matthew James Fischer, Mountain View, CA (US); Ron Porat, San Diego, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 175 days.

(21) Appl. No.: 15/054,778

(22) Filed: Feb. 26, 2016

(65) Prior Publication Data

US 2016/0182167 A1 Jun. 23, 2016

Related U.S. Application Data

(63) Continuation-in-part of application No. 14/252,646, filed on Apr. 14, 2014, now Pat. No. 9,712,231, and
(Continued)

(51) Int. Cl.
*H04W 72/04* (2009.01)
*H04H 20/16* (2008.01)
(Continued)

(52) U.S. Cl.
CPC .......... *H04H 20/16* (2013.01); *H04B 7/2612* (2013.01); *H04L 45/74* (2013.01); *H04L 67/12* (2013.01);
(Continued)

(58) Field of Classification Search
CPC .............. H04W 84/12; H04W 74/006; H04W 74/0816; H04W 72/04; H04W 74/002;
(Continued)

(56) References Cited

U.S. PATENT DOCUMENTS

| 2003/0169763 | A1* | 9/2003 | Choi | ..................... H04W 74/02 370/462 |
| 2011/0090855 | A1* | 4/2011 | Kim | ..................... H04B 7/0452 370/329 |

(Continued)

*Primary Examiner* — Sai Aung
(74) *Attorney, Agent, or Firm* — Garlick & Markison; Shayne X. Short

(57) ABSTRACT

A wireless communication device (alternatively, device) includes a processing circuitry configured to support communications with other wireless communication device(s) and to generate and process signals for such communications. In some examples, the device includes a communication interface and a processing circuitry, among other possible circuitries, components, elements, etc. to support communications with other wireless communication device(s) and to generate and process signals for such communications. A device generates and transmits a request to send (RTS) to group (RTG) frame to other devices. In response to the RTG frame, the device receives clear to send (CTS)(s) from one or more of the other devices and generates and transmits an orthogonal frequency division multiple access (OFDMA) data frame to those one or more of the other devices based thereon. The RTG frame can include different RTSs transmitted via different channels, sub-channels, sub-carriers, etc. to the different other devices.

20 Claims, 8 Drawing Sheets

Related U.S. Application Data a continuation-in-part of application No. 14/192,228, filed on Feb. 27, 2014, now Pat. No. 9,379,837.

(60) Provisional application No. 62/126,342, filed on Feb. 27, 2015, provisional application No. 61/811,861, filed on Apr. 15, 2013, provisional application No. 61/834,240, filed on Jun. 12, 2013, provisional application No. 61/973,361, filed on Apr. 1, 2014, provisional application No. 61/804,718, filed on Mar. 24, 2013, provisional application No. 61/888,873, filed on Oct. 9, 2013, provisional application No. 61/936,158, filed on Feb. 5, 2014.

(51) Int. Cl.

| | | |
|---|---|---|
| *H04L 29/06* | (2006.01) | |
| *H04L 12/741* | (2013.01) | |
| *H04B 7/26* | (2006.01) | |
| *H04W 74/00* | (2009.01) | |
| *H04L 29/08* | (2006.01) | |
| *H04W 74/08* | (2009.01) | |
| *H04L 5/00* | (2006.01) | |
| *H04L 27/26* | (2006.01) | |

(52) U.S. Cl.
CPC .............. *H04L 67/22* (2013.01); *H04L 69/22* (2013.01); *H04W 74/006* (2013.01); *H04L 5/0023* (2013.01); *H04L 5/0053* (2013.01); *H04L 27/2602* (2013.01); *H04W 74/0816* (2013.01)

(58) Field of Classification Search
CPC ............ H04W 74/004; H04W 72/121; H04W 74/0808; H04W 28/06; H04W 28/26; H04W 72/046; H04W 74/06; H04W 24/00; H04W 72/1289; H04W 8/26
See application file for complete search history.

(56) References Cited

U.S. PATENT DOCUMENTS

| | | | | |
|---|---|---|---|---|
| 2012/0327870 | A1* | 12/2012 | Grandhi | H04W 28/06 370/329 |
| 2013/0229996 | A1* | 9/2013 | Wang | H04W 72/0413 370/329 |
| 2014/0126509 | A1* | 5/2014 | You | H04B 7/04 370/329 |

* cited by examiner

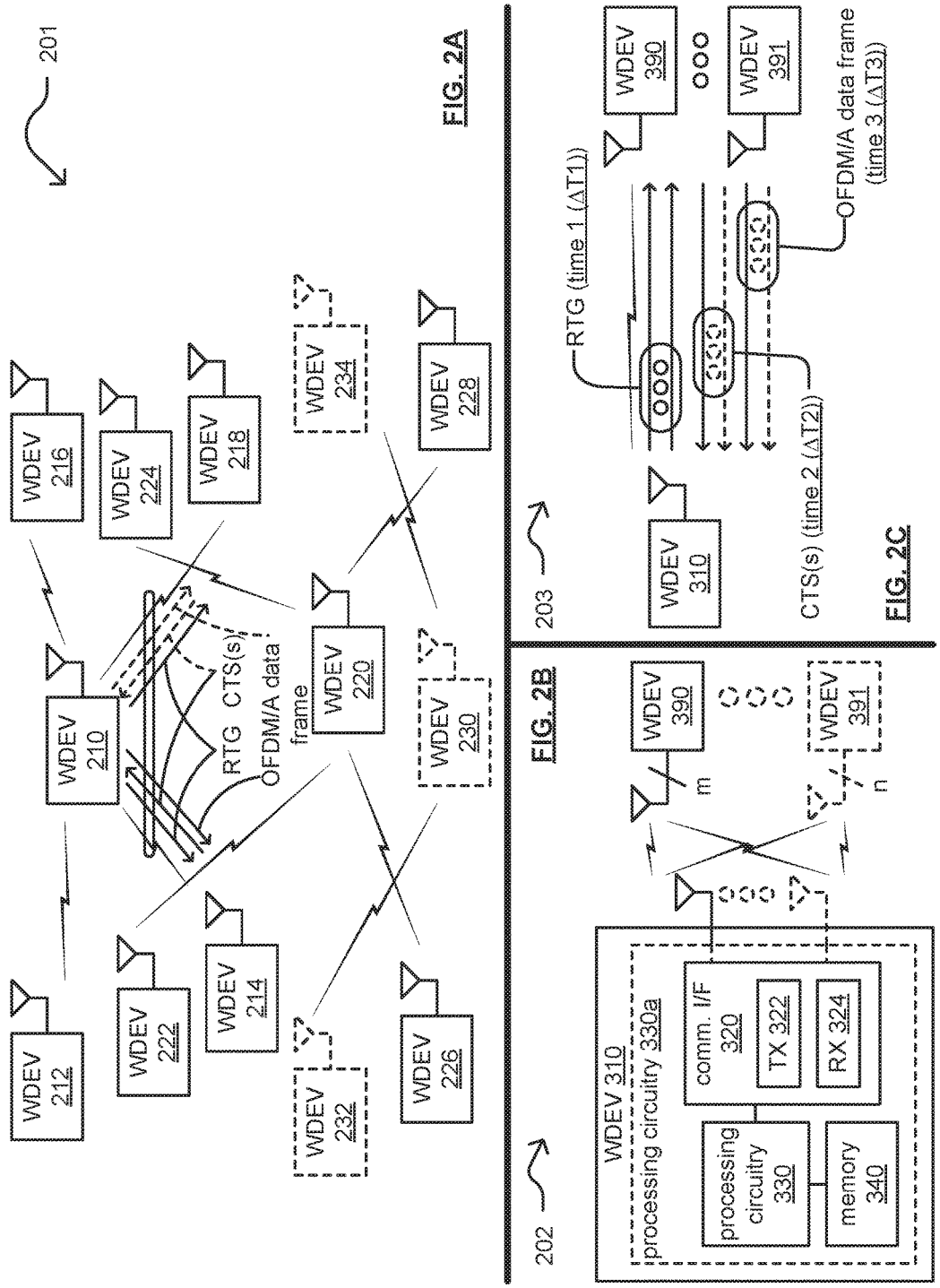

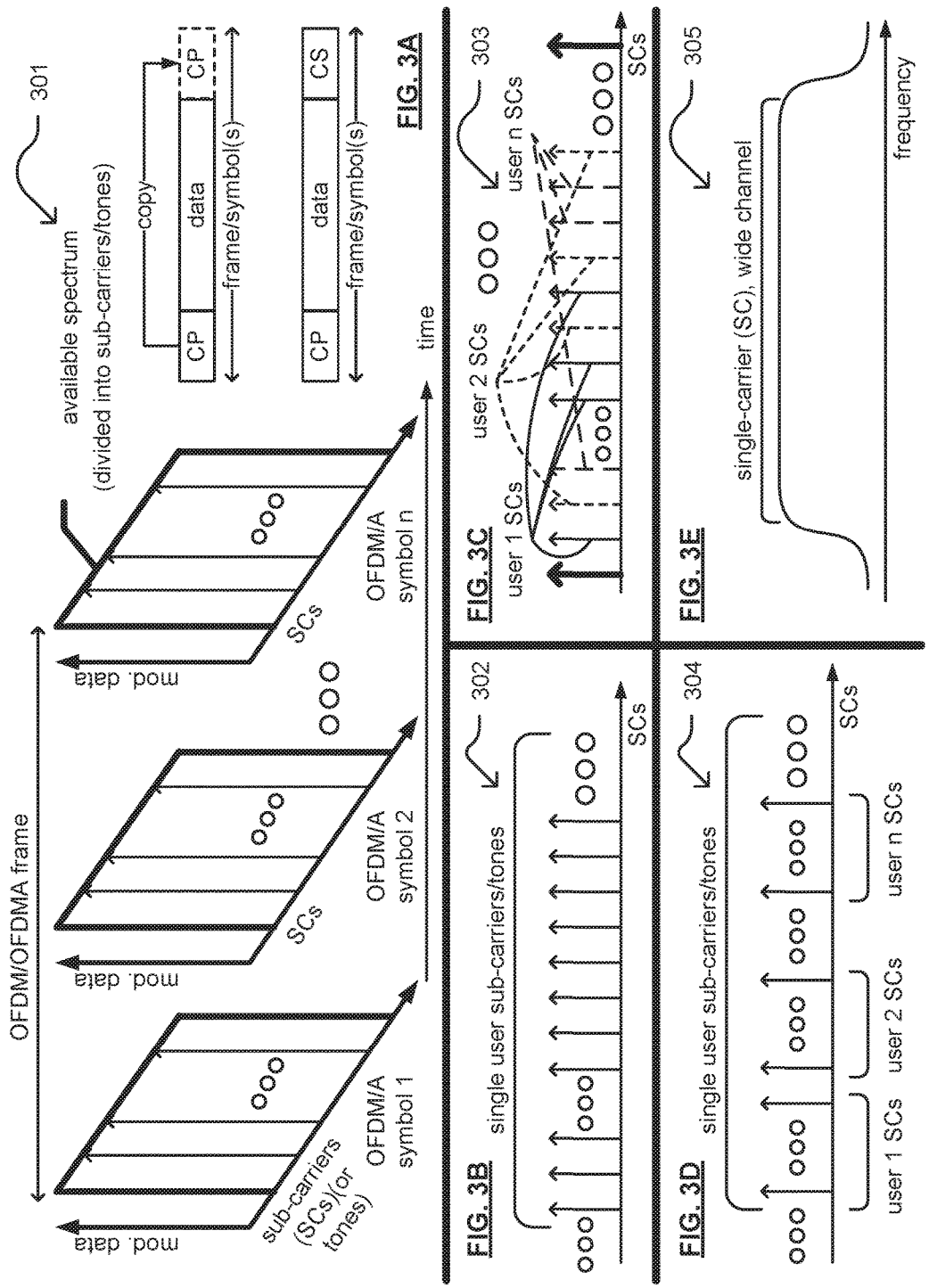

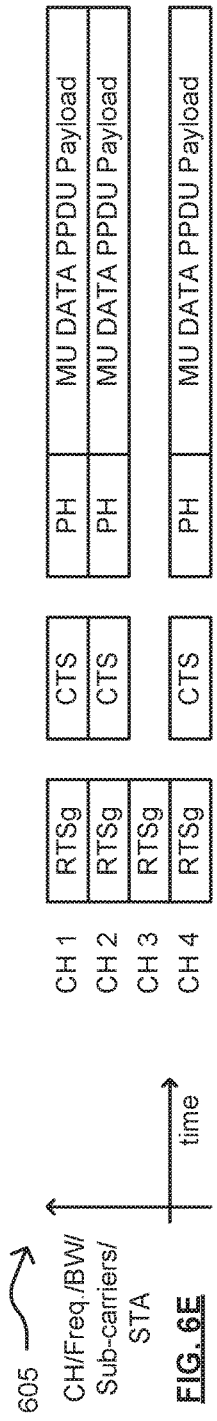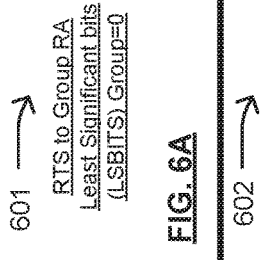

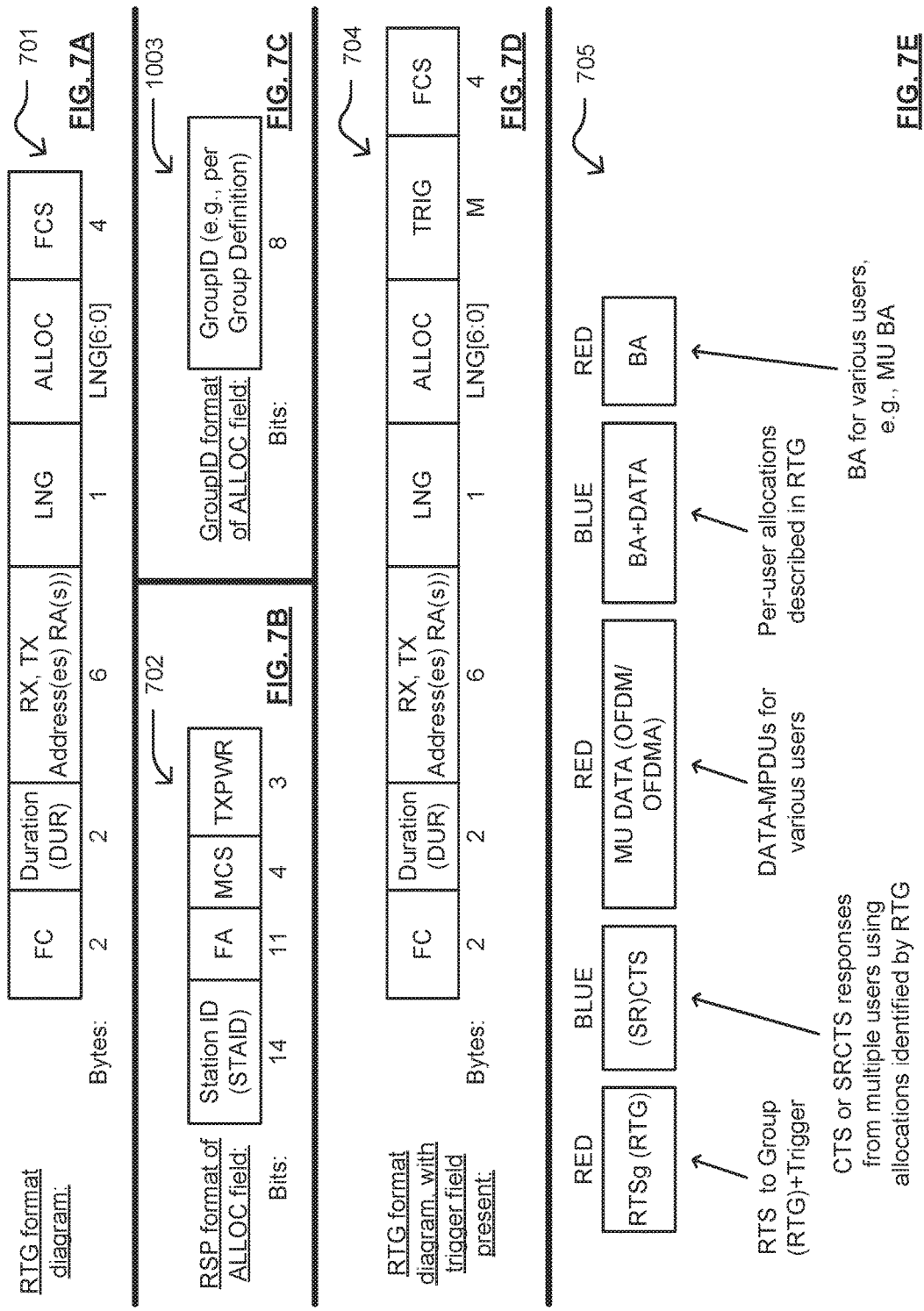

REQUEST TO SEND (RTS) TO GROUP WITHIN WIRELESS COMMUNICATIONS

CROSS REFERENCE TO RELATED PATENTS/PATENT APPLICATIONS

Provisional Priority Claim

The present U.S. Utility patent application claims priority pursuant to 35 U.S.C. § 119(e) to U.S. Provisional Application No. 62/126,342, entitled "Request to send (RTS) to group within wireless communications," filed Feb. 27, 2015, which is hereby incorporated herein by reference in its entirety and made part of the present U.S. Utility patent application for all purposes.

Continuation-in-Part (CIP) Priority Claims, 35 U.S.C. § 120

The present U.S. Utility patent application claims priority pursuant to 35 U.S.C. § 120, as a continuation-in-part (CIP), to the U.S. Utility application Ser. No. 14/252,646, entitled "Multiple narrow bandwidth channel access and MAC operation within wireless communications," filed Apr. 14, 2014, pending, which claims priority pursuant to 35 U.S.C. § 119(e) to U.S. Provisional Application No. 61/811,861, entitled "Multiple narrow bandwidth channel access within single user, multiple user, multiple access, and/or MIMO wireless communications," filed Apr. 15, 2013; U.S. Provisional Application No. 61/834,240, entitled "Media access control (MAC) for high efficiency wireless communications," filed Jun. 12, 2013; and U.S. Provisional Application No. 61/973,361, entitled "Multiple narrow bandwidth channel access and MAC operation within wireless communications," filed Apr. 1, 2014; all of which are hereby incorporated herein by reference in their entirety and made part of the present U.S. Utility patent application for all purposes.

The present U.S. Utility patent application also claims priority pursuant to 35 U.S.C. § 120, as a continuation-in-part (CIP), to the U.S. Utility application Ser. No. 14/192,228, entitled "Channel sharing within wireless communications," filed Feb. 27, 2014, pending, which claims priority pursuant to 35 U.S.C. § 119(e) to U.S. Provisional Application No. 61/804,718, entitled "Channel sharing within single user, multiple user, multiple access, and/or MIMO wireless communications," filed Mar. 24, 2013; U.S. Provisional Application No. 61/888,873, entitled "Channel sharing within wireless communications," filed Oct. 9, 2013; and U.S. Provisional Application No. 61/936,158, entitled "Channel sharing within wireless communications," filed Feb. 5, 2014; all of which are hereby incorporated herein by reference in their entirety and made part of the present U.S. Utility patent application for all purposes.

INCORPORATION BY REFERENCE

The following U.S. Utility Patent Application is hereby incorporated herein by reference in its entirety and made part of the present U.S. Utility Patent Application for all purposes:
1. U.S. Utility application Ser. No. 15/054,886, entitled "Spatial reuse clear to send (CTS) within wireless communications," filed concurrently on Feb. 26, 2016.

BACKGROUND

Technical Field

The present disclosure relates generally to communication systems; and, more particularly, to request to send (RTS) related communications within single user, multiple user, multiple access, and/or multiple-input-multiple-output (MIMO) wireless communications.

Description of Related Art

Communication systems support wireless and wire lined communications between wireless and/or wire lined communication devices. The systems can range from national and/or international cellular telephone systems, to the Internet, to point-to-point in-home wireless networks and can operate in accordance with one or more communication standards. For example, wireless communication systems may operate in accordance with one or more standards including, but not limited to, IEEE 802.11x (where x may be various extensions such as a, b, n, g, etc.), Bluetooth, advanced mobile phone services (AMPS), digital AMPS, global system for mobile communications (GSM), etc., and/or variations thereof.

In some instances, wireless communication is made between a transmitter (TX) and receiver (RX) using single-input-single-output (SISO) communication. Another type of wireless communication is single-input-multiple-output (SIMO) in which a single TX processes data into radio frequency (RF) signals that are transmitted to a RX that includes two or more antennae and two or more RX paths.

Yet an alternative type of wireless communication is multiple-input-single-output (MISO) in which a TX includes two or more transmission paths that each respectively converts a corresponding portion of baseband signals into RF signals, which are transmitted via corresponding antennae to a RX. Another type of wireless communication is multiple-input-multiple-output (MIMO) in which a TX and RX each respectively includes multiple paths such that a TX parallel processes data using a spatial and time encoding function to produce two or more streams of data and a RX receives the multiple RF signals via multiple RX paths that recapture the streams of data utilizing a spatial and time decoding function.

As the number and density of wireless communication devices operating within wireless communications systems continue to grow, the present art does not provide adequate means by which the increasing numbers of wireless communication devices can operate successfully without interfering with one another successfully in such dense deployments. The present art does not provide adequate means by which communications may be effectively and efficiently supported within such situations.

BRIEF DESCRIPTION OF THE SEVERAL VIEWS OF THE DRAWINGS

FIG. 2A is a diagram illustrating an embodiment of dense deployment of wireless communication devices.

FIG. 2B is a diagram illustrating an example of communication between wireless communication devices.

FIG. 2C is a diagram illustrating another example of communication between wireless communication devices.

FIG. 3A is a diagram illustrating an example of orthogonal frequency division multiplexing (OFDM) and/or orthogonal frequency division multiple access (OFDMA).

FIG. 3B is a diagram illustrating another example of OFDM and/or OFDMA.

FIG. 3C is a diagram illustrating another example of OFDM and/or OFDMA.

FIG. 3D is a diagram illustrating another example of OFDM and/or OFDMA.

FIG. 3E is a diagram illustrating an example of single-carrier (SC) signaling.

FIG. 6A is a diagram illustrating an example of a RTS to Group (e.g., RTSg, RTG, etc.).

FIG. 6B is a diagram illustrating another example of a RTS to Group (e.g., RTSg, RTG, etc.).

FIG. 6C is a diagram illustrating an example of at least a portion of spatial reuse (SR) CTS (SRCTS) based frame with STAID (Address information of the SRCTS transmitter) field included.

FIG. 6D is a diagram illustrating an example of at least a portion of spatial reuse (SR) CTS (SRCTS) based frame with no STAID field included.

FIG. 6E is a diagram illustrating an example of clear to send (CTS) for spatial reuse (SR) exchange.

FIG. 7A is a diagram illustrating an example of request to send (RTS) to group based MAC (media access control) data protocol unit (MPDU) format.

FIG. 7B is a diagram illustrating an example of response (RSP) format of an allocation (ALLOC) field within a RTS to group based MPDU format.

FIG. 7C is a diagram illustrating an example Group Identification (GroupID).

FIG. 7D is a diagram illustrating an example of a RTS to Group (e.g., RTSg, RTG, etc.) including a trigger field.

FIG. 7E is a diagram illustrating another example of request to send (RTS) to group based MAC (media access control) data protocol unit (MPDU) format.

DETAILED DESCRIPTION

Figure 1:
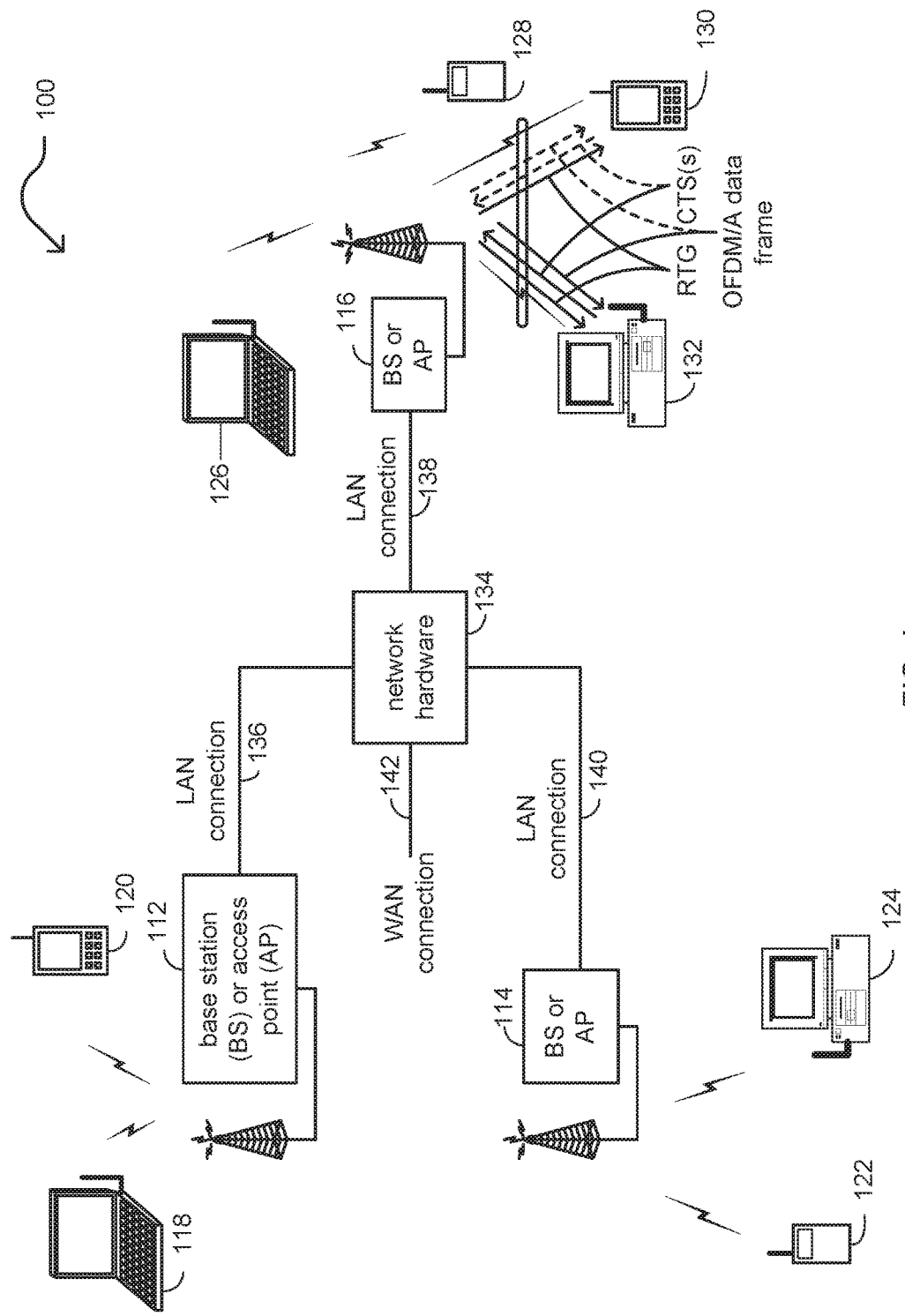
FIG. 1 is a diagram illustrating an embodiment of a wireless communication system.

FIG. 1 is a diagram illustrating an embodiment of a wireless communication system 100. The wireless communication system 100 includes base stations and/or access points 112-116, wireless communication devices 118-132 (e.g., wireless stations (STAs)), and a network hardware component 134. The wireless communication devices 118-132 may be laptop computers, or tablets, 118 and 126, personal digital assistants 120 and 130, personal computers 124 and 132 and/or cellular telephones 122 and 128. Other examples of such wireless communication devices 118-132 could also or alternatively include other types of devices that include wireless communication capability. The details of an embodiment of such wireless communication devices are described in greater detail with reference to FIG. 2B among other diagrams.

Some examples of possible devices that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

The base stations (BSs) or access points (APs) 112-116 are operably coupled to the network hardware 134 via local area network connections 136, 138, and 140. The network hardware 134, which may be a router, switch, bridge, modem, system controller, etc., provides a wide area network connection 142 for the communication system 100. Each of the base stations or access points 112-116 has an associated antenna or antenna array to communicate with the wireless communication devices in its area. Typically, the wireless communication devices register with a particular base station or access point 112-116 to receive services from the communication system 100. For direct connections (i.e., point-to-point communications), wireless communication devices communicate directly via an allocated channel.

Any of the various wireless communication devices (WDEVs) 118-132 and BSs or APs 112-116 may include a processing circuitry and/or a communication interface to support communications with any other of the wireless communication devices 118-132 and BSs or APs 112-116. In an example of operation, a processing circuitry and/or a communication interface implemented within one of the devices (e.g., any one of the WDEVs 118-132 and BSs or APs 112-116) is/are configured to process at least one signal received from and/or to generate at least one signal to be transmitted to another one of the devices (e.g., any other one of the WDEVs 118-132 and BSs or APs 112-116).

Note that general reference to a communication device, such as a wireless communication device (e.g., WDEVs) 118-132 and BSs or APs 112-116 in FIG. 1, or any other communication devices and/or wireless communication devices may alternatively be made generally herein using the term 'device' (e.g., with respect to FIG. 2A below, "device 210" when referring to "wireless communication device 210" or "WDEV 210," or "devices 210-234" when referring to "wireless communication devices 210-234"; or with respect to FIG. 2B below, use of "device 310" may alternatively be used when referring to "wireless communication device 310", or "devices 390 and 391 (or 390-391)" when referring to wireless communication devices 390 and 391 or WDEVs 390 and 391). Generally, such general references or designations of devices may be used interchangeably.

The processing circuitry and/or the communication interface of any one of the various devices, WDEVs 118-132 and BSs or APs 112-116, may be configured to support communications with any other of the various devices, WDEVs 118-132 and BSs or APs 112-116. Such communications may be uni-directional or bi-directional between devices. Also, such communications may be uni-directional between devices at one time and bi-directional between those devices at another time.

In an example, a device (e.g., any one of the WDEVs 118-132 and BSs or APs 112-116) includes a communication interface and/or a processing circuitry (and possibly other possible circuitries, components, elements, etc.) to support communications with other device(s) and to generate and process signals for such communications. The communication interface and/or the processing circuitry operate to perform various operations and functions to effectuate such communications (e.g., the communication interface and the processing circuitry may be configured to perform certain operation(s) in conjunction with one another, cooperatively, dependently with one another, etc. and other operation(s) separately, independently from one another, etc.). In some examples, such a processing circuitry includes all capability, functionality, and/or circuitry, etc. to perform such operations as described herein. In some other examples, such a communication interface includes all capability, functionality, and/or circuitry, etc. to perform such operations as described herein. In even other examples, such a processing circuitry and a communication interface include all capability, functionality, and/or circuitry, etc. to perform such operations as described herein, at least in part, cooperatively with one another.

In an example of implementation and operation, BS or AP 116 generates a request to send (RTS) to group (RTG) frame that includes a first RTS intended for WDEV 132 and second RTS for WDEV 130. In some examples, the first RTS is modulated within a first sub-channel of a communication channel, and the second RTS is modulated within a second sub-channel of a communication channel. These different sub-channels may be different sets of sub-carriers in an orthogonal frequency division multiplexing (OFDM) and/or orthogonal frequency division multiple access (OFDMA) application. The wireless communication device then transmits the RTG frame to the WDEV 132 and the WDEV 130 and receives, in response to the RTG frame, at least one clear to send (CTS) from the WDEV 132 and/or the WDEV 130. Then, the wireless communication device generates and transmits an OFDMA data frame that includes first data intended for WDEV 132 and/or second data intended for WDEV 130.

In general, the BS or AP 116 performs a frame exchange process with device and the WDEV 132 and/or the WDEV 130 including an RTG transmitted to WDEV 132 and the WDEV 130, at least one CTS received from the WDEV 132 and/or the WDEV 130, and an OFDMA date frame transmitted to the WDEV 132 and/or the WDEV 130.

FIG. 2A is a diagram illustrating an embodiment 201 of dense deployment of wireless communication devices (shown as WDEVs in the diagram). Any of the various WDEVs 210-234 may be access points (APs) or wireless stations (STAs). For example, WDEV 210 may be an AP or an AP-operative STA that communicates with WDEVs 212, 214, 216, and 218 that are STAs. WDEV 220 may be an AP or an AP-operative STA that communicates with WDEVs 222, 224, 226, and 228 that are STAs. In certain instances, at least one additional AP or AP-operative STA may be deployed, such as WDEV 230 that communicates with WDEVs 232 and 234 that are STAs. The STAs may be any type of one or more wireless communication device types including wireless communication devices 118-132, and the APs or AP-operative STAs may be any type of one or more wireless communication devices including as BSs or APs 112-116. Different groups of the WDEVs 210-234 may be partitioned into different basic services sets (BSSs). In some instances, at least one of the WDEVs 210-234 are included within at least one overlapping basic services set (OBSS) that cover two or more BSSs. As described above with the association of WDEVs in an AP-STA relationship, one of the WDEVs may be operative as an AP and certain of the WDEVs can be implemented within the same basic services set (BSS).

This disclosure presents novel architectures, methods, approaches, etc. that allow for improved spatial re-use for next generation WiFi or wireless local area network (WLAN) systems. Next generation WiFi systems are expected to improve performance in dense deployments where many clients and APs are packed in a given area (e.g., which may be an area [indoor and/or outdoor] with a high density of devices, such as a train station, airport, stadium, building, shopping mall, arenas, convention centers, colleges, downtown city centers, etc. to name just some examples). Large numbers of devices operating within a given area can be problematic if not impossible using prior technologies.

As wireless communication systems continue to include more and more WDEVs and those WDEVs continue to be more and more densely deployed, newer mechanism and procedures are presented herein that allow for better and more efficient use of the communication medium. For example, concurrent transmissions may be made concurrently with other communications when determined to be permissible based on comparison of various parameters associated with communications within the system.

In environments with highly dense populations of WLAN nodes (e.g., such as with reference FIG. 2A), total offered load of traffic is high. Multiple WDEVs have many frames in their transmit buffers and are trying to access the medium to make their transmissions. In such situations, the communication medium is frequently busy. As a result of the high level of traffic from the many competing WDEVs.

Overlapping basic services set (OBSS) STAs compete with each other for control of the medium. The medium is shared among many BSSs through the carrier sense multiple access/collision avoidance (CSMA/CA) mechanism and distributed coordination function (DCF) and enhanced distributed channel access (EDCA). Only one pair of WDEVs may exchange data within an area where either of the WDEVs in that pair can be heard by other WDEVs. Some spatial sharing of the medium could be possible (e.g., if the rules to access the communication medium allowed it).

Existing rules of access prevent/discourage/limit spatial sharing opportunities. For example, only one pair is allowed to use the medium at a time. Efficiency gains to be obtained if spatial reuse opportunities can be exploited.

In an example of implementation and operation, WDEV 210 generates a RTG frame that includes a first RTS intended for WDEV 214 that is modulated within a first sub-channel of a communication channel and a second RTS intended for WDEV 218 that is modulated within a second sub-channel of the communication channel. WDEV 210 then transmits the RTG frame to WDEV 214 and WDEV 218. WDEV 218 then receives, in response to the RTG frame, at least one CTS from WDEV 214 and/or WDEV 218. WDEV 210 then generates an OFDMA data frame that includes first data intended for WDEV 214 and/or WDEV 218 and transmits the OFDMA data frame to WDEV 214 and/or WDEV 218.

In one example, the OFDMA data frame includes the first data intended for WDEV 214 and excludes the second data intended for WDEV 218 when a CTS is received from WDEV 214 and no CTS is received from WDEV 218. In another example, the OFDMA data frame excludes the first data intended for WDEV 214 and includes the second data intended for WDEV 218 when a CTS is received from the WDEV 218 and no CTS is received from WDEV 214.

Also, in some examples, the WDEV 210 receives, in response to the RTG frame, a first CTS from WDEV 214 that is modulated within the first sub-channel of the communication channel and/or a second CTS from WDEV 218 that is modulated within the second sub-channel of the communication channel.

In another example of implementation and operation, WDEV 210 generates a RTG frame that includes a first RTS intended for WDEV 214 that is modulated within a first sub-channel of a communication channel and a second RTS intended for WDEV 218 that is modulated within a second sub-channel of the communication channel. In some examples, the RTG frame includes addressing information that specifies the RTG frame is intended for WDEV 214 and WDEV 218.

Such addressing information may be based on any one or more of an Organisationally Unique Identifier (OUI), a group identification field (group ID), and/or an association ID (AID), and/or combination thereof used to identify the WDEV 214 and WDEV 218. In some examples, the addressing information also specifies frequency resource allocation (e.g., channel, sub-channels, sub-carriers, etc.) for WDEV 214 and WDEV 218, modulation coding set (MCS) information for use by WDEV 214 and WDEV 218, or transmit power information for use by WDEV 214 and WDEV 218, and/or other information to be used by the WDEV 214 and WDEV 218 to determine when and how other communications may be effectuated with the WDEV 210.

Also, in some examples, the RTG frame has a particular format and includes any one or more of a frame control (FC) field, a duration (DUR) field, a receiver address (RA) field, a length (LNG) field, an allocation (ALLOC) field.

WDEV 210 then transmits the RTG frame to WDEV 214 and WDEV 218 and receives, in response to the RTG frame, a first CTS from WDEV 214 received via the first sub-channel of the communication channel and/or a second CTS from WDEV 218 via the second sub-channel of the communication channel. WDEV 210 then generates an OFDMA data frame that includes at least one of first data intended for WDEV 214 that is modulated within the first sub-channel of the communication channel and/or second data intended for WDEV 218 that is modulated within the second sub-channel of the communication channel and transmits the OFDMA data frame to WDEV 214 and/or WDEV 218.

FIG. 2B is a diagram illustrating an example 202 of communication between wireless communication devices. A wireless communication device 310 (e.g., which may be any one of devices 118-132 as with reference to FIG. 1) is in communication with another wireless communication device 390 (and/or any number of other wireless communication devices up through another wireless communication device 391) via a transmission medium. The wireless communication device 310 includes a communication interface 320 to perform transmitting and receiving of at least one signal, symbol, packet, frame, etc. (e.g., using a transmitter 322 and a receiver 324) (note that general reference to packet or frame may be used interchangeably).

Generally speaking, the communication interface 320 is implemented to perform any such operations of an analog front end (AFE) and/or physical layer (PHY) transmitter, receiver, and/or transceiver. Examples of such operations may include any one or more of various operations including conversions between the frequency and analog or continuous time domains (e.g., such as the operations performed by a digital to analog converter (DAC) and/or an analog to digital converter (ADC)), gain adjustment including scaling, filtering (e.g., in either the digital or analog domains), frequency conversion (e.g., such as frequency upscaling and/or frequency downscaling, such as to a baseband frequency at which one or more of the components of the device 310 operates), equalization, pre-equalization, metric generation, symbol mapping and/or de-mapping, automatic gain control (AGC) operations, and/or any other operations that may be performed by an AFE and/or PHY component within a wireless communication device.

In some implementations, the wireless communication device 310 also includes a processing circuitry 330, and an associated memory 340, to execute various operations including interpreting at least one signal, symbol, packet, and/or frame transmitted to wireless communication device 390 and/or received from the wireless communication device 390 and/or wireless communication device 391. The wireless communication devices 310 and 390 (and/or 391) may be implemented using at least one integrated circuit in accordance with any desired configuration or combination of components, modules, etc. within at least one integrated circuit. Also, the wireless communication devices 310, 390, and/or 391 may each include one or more antennas for transmitting and/or receiving of at least one packet or frame (e.g., WDEV 390 may include m antennae, and WDEV 391 may include n antennae).

Also, in some examples, note that one or more of the processing circuitry 330, the communication interface 320 (including the TX 322 and/or RX 324 thereof), and/or the memory 340 may be implemented in one or more "processing modules," "processing circuits," "processors," and/or "processing units" or their equivalents. Considering one example, one processing circuitry 330a may be implemented to include the processing circuitry 330, the communication interface 320 (including the TX 322 and/or RX 324 thereof), and the memory 340. Considering another example, two or more processing circuitries may be implemented to include the processing circuitry 330, the communication interface 320 (including the TX 322 and/or RX 324 thereof), and the memory 340. In such examples, such a "processing circuitry" or "processing circuitries" (or "processor" or "processors") is/are configured to perform various operations, functions, communications, etc. as described herein. In general, the various elements, components, etc. shown within the device 310 may be implemented in any number of "processing modules," "processing circuits," "processors," and/or "processing units" (e.g., 1, 2, . . . , and generally using N such "processing modules," "processing circuits," "processors," and/or "processing units", where N is a positive integer greater than or equal to 1).

In some examples, the device 310 includes both processing circuitry 330 and communication interface 320 configured to perform various operations. In other examples, the device 310 includes processing circuitry 330a configured to perform various operations. Generally, such operations include generating, transmitting, etc. signals intended for one or more other devices (e.g., device 390 through 391) and receiving, processing, etc. other signals received for one or more other devices (e.g., device 390 through 391).

FIG. 2C is a diagram illustrating another example 203 of communication between wireless communication devices. In this example 203, WDEV 310 performs a frame exchange process with device and the WDEV 390 and/or the WDEV 391 including an RTG transmitted to WDEV 390 and the WDEV 391 at or during a first time or time period (e.g., time 1, ΔT1, etc.), at least one CTS received from the WDEV 390 and/or the WDEV 391 at or during a second time or time period (e.g., time 2, ΔT2, etc.), and an OFDMA date frame transmitted to the WDEV 390 and/or the WDEV 391 at or during a third time or time period (e.g., time 3, ΔT3, etc.).

In another example of implementation and operation, the WDEV 310 (or WDEVs 390, 391, etc.) includes both a processing circuitry to perform many of the operations described above and also includes a communication interface, coupled to the processing circuitry, that is configured to support communications within a satellite communication system, a wireless communication system, a wired communication system, a fiber-optic communication system, and/or a mobile communication system.

FIG. 3A is a diagram illustrating an example 301 of orthogonal frequency division multiplexing (OFDM) and/or orthogonal frequency division multiple access (OFDMA). OFDM's modulation may be viewed as dividing up an available spectrum into a plurality of narrowband sub-carriers (e.g., relatively lower data rate carriers). The sub-carriers are included within an available frequency spectrum portion or band. This available frequency spectrum is divided into the sub-carriers or tones used for the OFDM or OFDMA symbols and packets/frames. Note that sub-carrier or tone may be used interchangeably. Typically, the frequency responses of these sub-carriers are non-overlapping and orthogonal. Each sub-carrier may be modulated using any of a variety of modulation coding techniques (e.g., as shown by the vertical axis of modulated data).

A communication device may be configured to perform encoding of one or more bits to generate one or more coded bits used to generate the modulation data (or generally, data). For example, a processing circuitry and the communication interface of a communication device may be configured to perform forward error correction (FEC) and/or error checking and correction (ECC) code of one or more bits to generate one or more coded bits. Examples of FEC and/or ECC may include turbo code, convolutional code, turbo trellis coded modulation (TTCM), low density parity check (LDPC) code, Reed-Solomon (RS) code, BCH (Bose and Ray-Chaudhuri, and Hocquenghem) code, binary convolutional code (BCC), Cyclic Redundancy Check (CRC), and/or any other type of ECC and/or FEC code and/or combination thereof, etc. Note that more than one type of ECC and/or FEC code may be used in any of various implementations including concatenation (e.g., first ECC and/or FEC code followed by second ECC and/or FEC code, etc. such as based on an inner code/outer code architecture, etc.), parallel architecture (e.g., such that first ECC and/or FEC code operates on first bits while second ECC and/or FEC code operates on second bits, etc.), and/or any combination thereof. The one or more coded bits may then undergo modulation or symbol mapping to generate modulation symbols. The modulation symbols may include data intended for one or more recipient devices. Note that such modulation symbols may be generated using any of various types of modulation coding techniques. Examples of such modulation coding techniques may include binary phase shift keying (BPSK), quadrature phase shift keying (QPSK), 8-phase shift keying (PSK), 16 quadrature amplitude modulation (QAM), 32 amplitude and phase shift keying (APSK), etc., uncoded modulation, and/or any other desired types of modulation including higher ordered modulations that may include even greater number of constellation points (e.g., 1024 QAM, etc.).

FIG. 3B is a diagram illustrating another example 302 of OFDM and/or OFDMA. A transmitting device transmits modulation symbols via the sub-carriers. Note that such modulation symbols may include data modulation symbols, pilot modulation symbols (e.g., for use in channel estimation, characterization, etc.) and/or other types of modulation symbols (e.g., with other types of information included therein). OFDM and/or OFDMA modulation may operate by performing simultaneous transmission of a large number of narrowband carriers (or multi-tones). In some applications, a guard interval (GI) or guard space is sometimes employed between the various OFDM symbols to try to minimize the effects of ISI (Inter-Symbol Interference) that may be caused by the effects of multi-path within the communication system, which can be particularly of concern in wireless communication systems. In addition, a cyclic prefix (CP) and/or cyclic suffix (CS) (shown in right hand side of FIG. 3A) that may be a copy of the CP may also be employed within the guard interval to allow switching time (e.g., such as when jumping to a new communication channel or sub-channel) and to help maintain orthogonality of the OFDM and/or OFDMA symbols. Generally speaking, an OFDM and/or OFDMA system design is based on the expected delay spread within the communication system (e.g., the expected delay spread of the communication channel).

In a single-user system in which one or more OFDM symbols or OFDM packets/frames are transmitted between a transmitter device and a receiver device, all of the sub-carriers or tones are dedicated for use in transmitting modulated data between the transmitter and receiver devices. In a multiple user system in which one or more OFDM symbols or OFDM packets/frames are transmitted between a transmitter device and multiple recipient or receiver devices, the various sub-carriers or tones may be mapped to different respective receiver devices as described below with respect to FIG. 3C.

FIG. 3C is a diagram illustrating another example 303 of OFDM and/or OFDMA. Comparing OFDMA to OFDM, OFDMA is a multi-user version of the popular orthogonal frequency division multiplexing (OFDM) digital modulation scheme. Multiple access is achieved in OFDMA by assigning subsets of sub-carriers to individual recipient devices or users. For example, first sub-carrier(s)/tone(s) may be assigned to a user 1, second sub-carrier(s)/tone(s) may be assigned to a user 2, and so on up to any desired number of users. In addition, such sub-carrier/tone assignment may be dynamic among different respective transmissions (e.g., a first assignment for a first packet/frame, a second assignment for second packet/frame, etc.). An OFDM packet/frame may include more than one OFDM symbol. Similarly, an OFDMA packet/frame may include more than one OFDMA symbol. In addition, such sub-carrier/tone assignment may be dynamic among different respective symbols within a given packet/frame or superframe (e.g., a first assignment for a first OFDMA symbol within a packet/frame, a second assignment for a second OFDMA symbol within the packet/frame, etc.). Generally speaking, an OFDMA symbol is a particular type of OFDM symbol, and general reference to OFDM symbol herein includes both OFDM and OFDMA symbols (and general reference to OFDM packet/frame herein includes both OFDM and OFDMA packets/frames, and vice versa). FIG. 3C shows example 303 where the assignments of sub-carriers to different users are intermingled among one another (e.g., sub-carriers assigned to a first user includes non-adjacent sub-carriers and at least one sub-carrier assigned to a second user is located in between two sub-carriers assigned to the first user). The different groups of sub-carriers associated with each user may be viewed as being respective channels of a plurality of channels that compose all of the available sub-carriers for OFDM signaling.

FIG. 3D is a diagram illustrating another example 304 of OFDM and/or OFDMA. In this example 304, the assignments of sub-carriers to different users are located in different groups of adjacent sub-carriers (e.g., first sub-carriers assigned to a first user include first adjacently located sub-carrier group, second sub-carriers assigned to a second user include second adjacently located sub-carrier group, etc.). The different groups of adjacently located sub-carriers associated with each user may be viewed as being respective channels of a plurality of channels that compose all of the available sub-carriers for OFDM signaling.

FIG. 3E is a diagram illustrating an example 305 of single-carrier (SC) signaling. SC signaling, when compared to OFDM signaling, includes a singular relatively wide channel across which signals are transmitted. In contrast, in OFDM, multiple narrowband sub-carriers or narrowband sub-channels span the available frequency range, bandwidth, or spectrum across which signals are transmitted within the narrowband sub-carriers or narrowband sub-channels.

Generally, a communication device may be configured to include a processing circuitry and the communication interface (or alternatively a processing circuitry, such a processing circuitry 330a shown in FIG. 2B) configured to process received OFDM and/or OFDMA symbols and/or frames (and/or SC symbols and/or frames) and to generate such OFDM and/or OFDMA symbols and/or frames (and/or SC symbols and/or frames).

In certain of the following examples, diagrams, etc., a wireless communication device referred to as A is wireless communication device A (WDEV_A), B is wireless communication device B (WDEV_B), and so on.

Figure 4A:
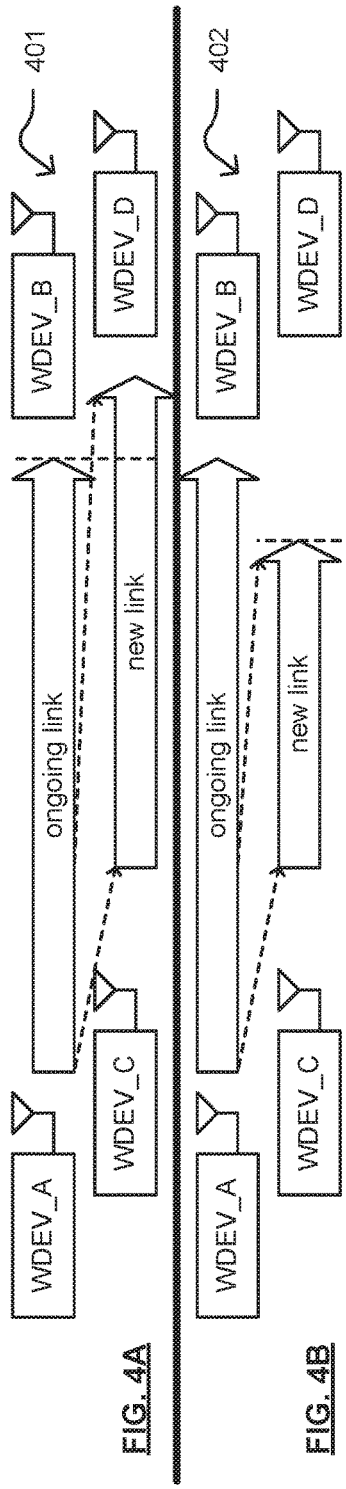
FIG. 4A is a diagram illustrating another example of communication between wireless communication devices.

FIG. 4A is a diagram illustrating another example 401 of communication between wireless communication devices. Novel mechanisms presented herein allow C to transmit on top of the ongoing A→B transmission under certain conditions. C and/or D is/are configured to process one or more parameters associated with communications between A and B, and when there is favorable comparison of those one or more parameters with one or more considerations, then C determines it is permissible to transmit to D even if there are ongoing communications between A and B.

Generally speaking, a transmission begins from device A to B (e.g., from WDEV_A to WDEV_B). Communications described from A to B (or A→B) may be understood as being from WDEV_A to WDEV_B. Similar suffix conventions may be used as well (e.g., communications described from C to D may be understood as being from WDEV_C to WDEV_D, and so on). Nearby devices such as device C (and not devices A/B) will begin decoding the A→B signal (packet or frame), and these nearby devices may also have decoded frames that were optionally used to setup the A→B link (e.g., a request to send/clear to send (RTS/CTS) exchange). The setup frames and/or the headers (PHY & MAC) in the A→B frame contain information that allow such a nearby device to determine various things such as (a) how interference resilient the A→B frame is, and (b) how strongly this device will interfere with the A→B link if it begins transmitting. Some of this "information" will already be contained in standard frame headers and certain exchanged frames (e.g., RTS/CTS frames). Based on above information it has extracted from the A→B header and other frames, plus the power at which it received the A→B header and of other frames, a nearby device C may begin transmitting (on top of, i.e., simultaneously to, the A→B link) to another nearby device D, possibly subject to certain conditions.

Alternatively or in addition to, C and/or D may determine certain parameters associated with communications between A and B implicitly based on analysis of those communications. In some examples, information is included explicitly within the communications between A and B and may then be extracted by C and/or D. In other examples, C and/or D process/processes the communications to determine certain characteristics of those communications to determine such information implicitly. In other examples, C and/or D determines certain parameters associated with communications between A and B implicitly and based on information is included explicitly within the communications between A and B.

A processing circuitry within device C may be configured to process communication between A and B to determine the one or more concurrent transmission parameters that includes a concurrent transmission start time. The information determined based on the communication between A and B may indicate a particular time at which the device C should begin its concurrent transmission. The processing circuitry within device C may then be configured direct the communication interface to transmit the second signal during receipt of a signal from A to B and to begin transmission of the signal based on the concurrent transmission start time. In some instances, the one or more concurrent transmission parameters may include a concurrent transmission end time that indicates when the concurrent transmission should end.

Figure 4B:
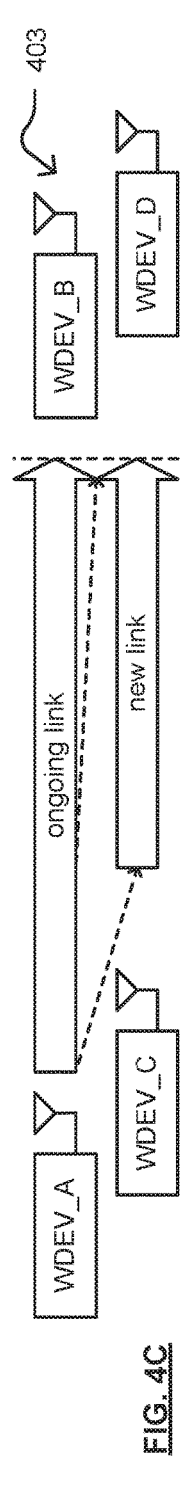
FIG. 4B is a diagram illustrating another example of communication between wireless communication devices.

FIG. 4B is a diagram illustrating another example 402 of communication between wireless communication devices. This diagram shows that the concurrent transmission from device C to D ends before the transmission from device A to B.

Figure 4C:
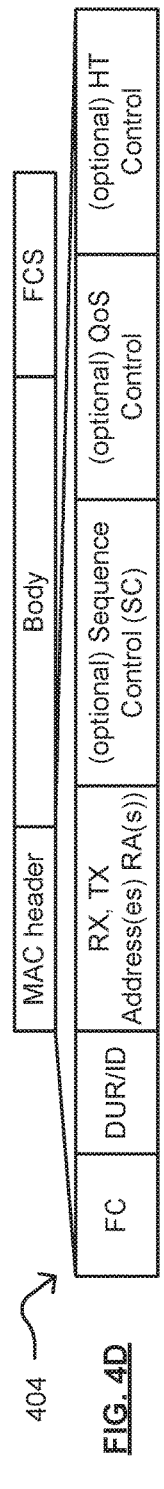
FIG. 4C is a diagram illustrating another example of communication between wireless communication devices.

FIG. 4C is a diagram illustrating another example 403 of communication between wireless communication devices. This diagram shows that the concurrent transmission from device C to D ends at the same time as the transmission from device A to B.

Referring back to FIG. 4A, that diagram shows that the concurrent transmission from device C to D ends after the transmission from device A to B. Concurrent transmission start and end times are just some examples of concurrent transmission parameters that may be determined based on the communications between A and B.

Among consideration of other parameters, consideration of transmission power may also be made. For example, consider that device C overhears the A→B header and determines that if it transmits with 10 dBm power because such a transmission will cause negligible interference to A and B, and then device C may began a transmission to some other device D. In another example, consider that device C has previously reached an agreement with device A that allows C to transmit on top of any A transmission (e.g., such as during some prior frame exchange between those devices, such as an RTS/CTS frame exchange). Then, device C overhears A→B header, and device C is allowed to transmit based on this agreement, and thus C begins transmitting to D.

Figure 4D:
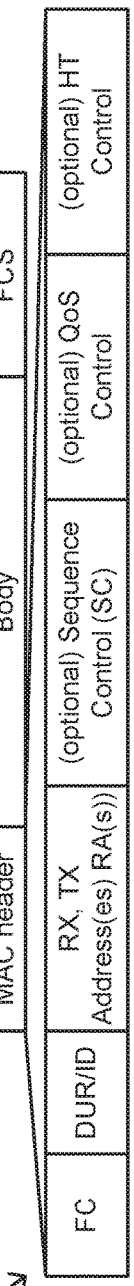
FIG. 4D is a diagram illustrating an example of a frame for use in wireless communications.

FIG. 4D is a diagram illustrating an example 404 of a frame for use in wireless communications. Generally speaking, a frame employed within such wireless communications includes the following basic components: media access control (MAC) header, a variable length frame body, and a frame check sequence (FCS). In certain embodiments, the MAC header includes fields for each of frame control (FC), duration (DUR/ID), address (e.g., receiver and/or transmitter addresses), sequence control information, optional Quality of Service (QoS) Control information (e.g., for QoS data frames only), and HT Control fields (+HTC frames only) (optional fields). Note that such a frame structure is illustrative and an example of such a frame structure as may be used herein, and alternative embodiments of frame structures may also be employed.

Within such communication systems that include many WDEVs that may be densely employed, OFDMA and/or other multiple user (MU) physical layer (PHY) Convergence Procedure (PLCP) Protocol Data Unit (PPDU) transmissions performed therein involve multiple transmitters or multiple receivers (e.g., STAs, APs, etc.). Control of the medium during OFDMA transmissions can be problematic such as within very dense deployments such as described with reference to FIG. 2A, among others. Normal access rules attempt to provide protection from hidden nodes (e.g., STAs that may not be detectable by certain other STAs) by exchanging request to send/clear to send (RTS/CTS) between the transmitter and the recipient of a DATA exchange. DATA in OFDMA PPDUs needs to have multiple coverage spaces for protective exchanges. Protection for multiple coverage spaces potentially requires multiple RTS-CTS exchanges, but multiple RTS-CTS exchanges can be very inefficient in some applications such as within very dense deployments such as described with reference to FIG. 2, among others.

Parallel RTS-CTS process involves communications at least two WDEVs. An RTS To Group (RTG) is sent to address multiple recipients (e.g., from WDEV 310 to WDEVs 390-391 such as in FIG. 2B). An RTS to Group includes special addressing to indicate which recipients will respond with CTS. The Receiver Address (RA) address field of the RTS to Group includes group information. For example, is may include an RA field Organisationally Unique Identified (OUI) portion of the address contains a signaling OUI value that is used only for the purpose of indicating that the RTS is a group RTS (RTG). The remaining 24 bits contain: GroupID/association ID (AID) range indicator subfield, and Group ID or AID range subfield. Note that Group Identification (GroupID) may be based on, interpreted based on, etc. a previously received and/or defined Group Definition or Group Definition Field.

In some examples, recipients of the RTG each respond with CTS simultaneously. In some examples, each recipient of the RTG responds with a respective CTS transmitted via the sub-channel, sub-carriers, etc. via which it received its respective RTS within the RTG such as described with reference to FIG. 4E. Ideally, protective coverage is established surrounding all RTG and CTS transmitters. Some nearby recipients might not correctly receive either or both of the RTS and CTS, due to interference, for example. Following CTS transmissions, the initiator of the exchange sends the MU PPDU (e.g., data) to the intended recipients of the RTG. In some examples, the initiator of the exchange sends the MU PPDU (e.g., data) to those of the intended recipients of the RTG that have actually responded with a respective CTS (e.g., sends the MU PPDU (e.g., data) to only those intended recipients of the RTG who sent a CTS).

Figure 4E:
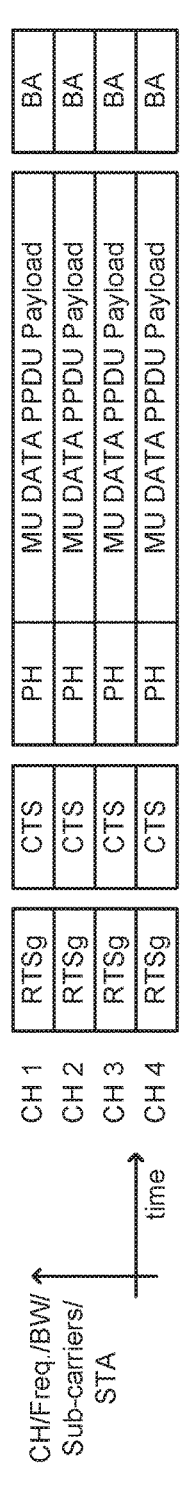
FIG. 4E is a diagram illustrating an example of a parallel request to send/clear to send (RTS/CTS) frame exchange.

FIG. 4E is a diagram illustrating an example 405 of a parallel request to send/clear to send (RTS/CTS) frame exchange. An RTS to Group is sent to address multiple recipients (e.g., 4 different STAs such as STA1, STA2, STA3, STA4). For example, this can include the recipients of the OFDMA PPDU that the transmitter of the RTS to Group intends to transmit, e.g. group=STA1, STA2, STA3, STA4. A different respective RTS is transmitted to each of the respective STA1, STA2, STA3, STA4 via a different respective sub-channel, subset of sub-carriers, etc.

Recipients of the RTS to Group (RTG) each respond with a respective CTS simultaneously. For example, STA1 receives a first RTS via a first sub-channel, subset of sub-carriers, etc. and responds with a first CTS via that same first sub-channel, subset of sub-carriers, etc. Similarly, STA2 receives a second RTS via a second sub-channel, subset of sub-carriers, etc. and responds with a second CTS via that same second sub-channel, subset of sub-carriers, etc. In some examples, the content of the CTS frames from the different STAs is identical, and the intended recipient can receive it, as well as third party STAs. CTS frames can be sent using same channel(s) as RTG. In other examples, the content of the CTS frames from the different STAs are different and can identify the particular STA from which the CTS is being transmitted.

In some example, GroupID information can contain channelization information and CTS frames are transmitted according to GroupID based channelization information which will also be used for DATA PPDU channel assignments. In the diagram, PH=PHY Header field, BA=Block ACK frame, MU=multi user, PPDU=PLCP Protocol Data Unit (PPDU).

Figures 5A, 5B:
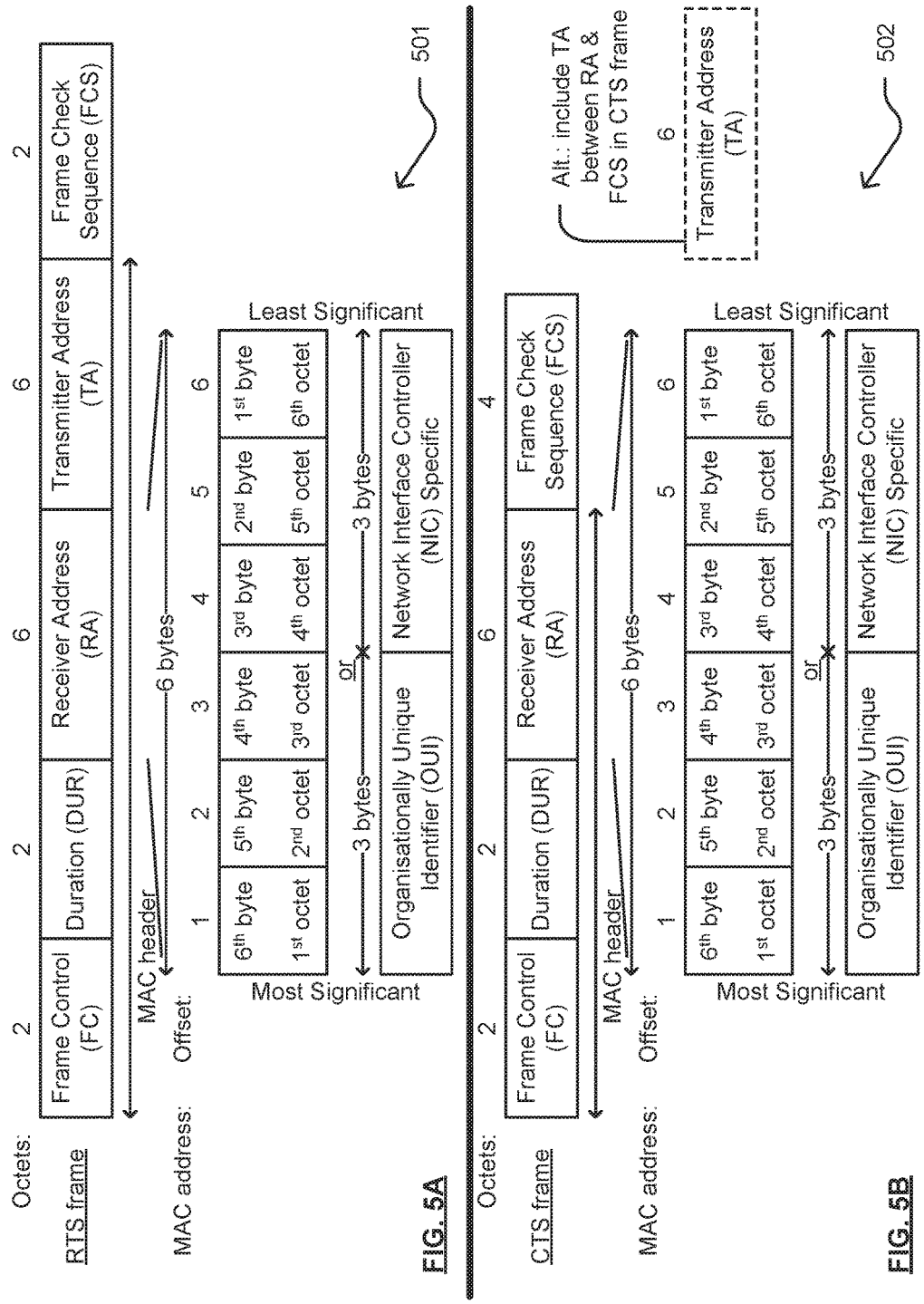
FIG. 5A is a diagram illustrating an example of a request to send (RTS) frame format.
FIG. 5B is a diagram illustrating an example of a clear to send (CTS) frame format.

FIG. 5A is a diagram illustrating an example 501 of a request to send (RTS) frame format. Such an RTS as described in this diagram includes a FC, DUR, RA, TA, and FCS fields and can be understood generally with reference to the format of FIG. 4D. The receiver address (RA) address field of RTS to Group includes group information. The Organisationally Unique Identifier (OUI) portion of the RA field address contains a signaling OUI value that is used only for the purpose of indicating that the RTS is an RTS to Group. The remaining 24 bits (e.g., Network Interface Controller (NIC) Specific portion) may contain various contents including GroupID/AID range indicator field and Group ID or AID range.

STAs that are addressed either through the GroupID value or the AID range value respond with CTS. GroupID is a numerical value corresponding to a group of STA which has membership as defined in a previous management exchange (e.g., such as based on a previously communicated Group Definition Field). If AID range is provided, then each recipient STA examines the range to see if it has an AID assigned to itself which is within the given range. The STAs identifying themselves either as members of the identified group or within the AID range will respond with a CTS. CTS RA and DUR fields are determined from RTS to Group. The RTS Transmitter Address (TA) value becomes CTS RA value. The RTS DUR value is reduced by SIFS and CTS PPDU duration to fill CTS DUR field.

FIG. 5B is a diagram illustrating an example 502 of a clear to send (CTS) frame format. Such a CTS as described in this diagram includes a FC, DUR, RA, and FCS fields and can be understood generally with reference to the format of FIG. 4D. In some alternative examples, the CTS may also include a TA field between RA and FCS to indicate from which WDEV the CTS has been transmitted and can have certain similarities to the RTS frame format of FIG. 5A. For example, such a CTS may include an OUI portion, a NIC Specific portion, etc. to implemented the MAC address such as with respect to the RTS described above with respect to FIG. 5A.

FIG. 6A is a diagram illustrating an example 601 of a RTS to Group (e.g., RTSg, RTG, etc.). In certain example, there are 24 bits in the least significant portion of the RA of the RTS to group frame (e.g., NIC Specific portion). These are the $4^{th}$, $5^{th}$, and $6^{th}$ octets of the RA transmitted on the air as may be understood with respect to FIG. 6A and FIG. 6B.

This diagram shows an examples where RTS To Group Receiver Address (RA) Least Significant (LS) Bits (LS-BITS) Group=0. For example, this diagram shows the least significant (LS) bits (LSBITS) with Group=0 (e.g., Group Identification (GroupID) such as based on a previously received Group Definition or Group Definition Field).

In one example, the 24 bits may contain the following subfields when the Group bit has the value of 0:

1. Group—an indicator bit of whether the remaining bits of the lower portion of the RA are an encoding of a set of AID values, or contain a GroupID value.
2. Lowest_AID—the lowest AID value in a range of AID values.
3. AID_RANGE—when added to the Lowest_AID value, indicates the highest AID value of the range of AID values.

FIG. 6B is a diagram illustrating another example 602 of a RTS to Group (e.g., RTSg, RTG, etc.). This example 602 includes least significant (LS) bits (LSBITS) with Group=1 (e.g., Group Identification (GroupID) such as based on a previously received Group Definition or Group Definition Field).

In another example, the 24 bits may contain the following subfields when the Group bit has the value of 1:

1. Group—an indicator bit of whether the remaining bits of the lower portion of the RA are an encoding of a set of AID values, or contain a GroupID value
2. GroupID—the numerical value of a previously defined group of STA
3. Members of the group are indicated in a previously transmitted frame exchange (e.g., a management frame exchange, or alternatively a fixed group assignment defined by the AP and indicated in transmissions such as Beacons).

GroupID (Group Identification per Group Definition) Information may be implemented as follows. When Group=1, GroupID value corresponds to one of a previously defined group. The group definition is communicated and defined separately (e.g., prior to the transmission of a frame that includes the GroupID, e.g., within a separate frame exchange).

The group definition information includes STAs that belong to the group (e.g., membership of one or more STAs). It may also include channelization information (e.g., that each group member transmits on all sub-channels, e.g., a QUAD non-HT PPDU or a DUP non-HT PPDU, etc., e.g. that each group member transmits on some specific sub-channel(s), and/or e.g. parallel OFDMA-type transmission).

Group information can be pseudo-static such that it persists for long periods of time or it can change as frequently as is desired.

Association ID (AID) Information may be implemented as follows. When the RTS to group frame contains AID information, then each STA can have multiple AID values assigned. Some AIDs can correspond to GroupID-like information such as follows: STA4 has AID=20, AID=1000, AID=2001.

In one example, the AP can define OFDMA information that is coupled with each AID value and convey this information to each participant. For example, consider that AID=20 means STA4, normal behavior, not associated with OFDMA, but used for power save, then any of the following examples may be implemented:

In one example, consider AID=1000 means STA4, 20 MHz transmission on channel 3, using TX power of N dBm, MCS5.

In another example, consider AID=2001 means STA4, QUAD non-HT PPDU transmission on channels 1,2,3,4 using TX power of M dBm, MCS4.

Note that some information specified for a given AID can include "choice" (e.g., MCS could be "choice of responder", e.g., MCS could be "appropriate value for response frame", and/or e.g., TX power could be "choice of responder").

The AID information could be embedded in AID values (e.g., some bits of AID could be encoded to indicate transmit power (e.g., Txpower, Tx power, tx power, TxPWR, etc.), MCS, channel, etc.).

An Association ID (AID) Encoded Information Example is provided below. AID is nominally 14 bits. AID values below a certain value would be normal AID values (e.g., AID values below 1024 are normal values with no special interpretation). AID values that are above the specified value would include bits that have specific meaning. For example, the following bits may be included:

a. 3 bits—channel
b. 2 bits—Tx power
c. 3 bits—modulation coding set (MCS)

The location of these bits within the AID is best placed toward the most significant bits, since this facilitates the use of a range of AID values in an RTS to group frame.

AID interpretation could be contextual. AID has an encoded AID only when it appears in the special RA field of an RTS to group, for example.

AID OFDMA information is ten delivered to each STA. This may be performed by the creation of a management field that includes per-AID OFDMA information. This new management field is transmitted, for example, in association response and/or other management frames (e.g. management action new type=AID OFDMA Information).

AID values that are coupled with OFDMA information can be used for UL OFDMA triggering. Such a trigger structure can be implemented to include AID values. Since encoded AID values can include information such as channel and Tx power, encoded AID values used in the trigger frame can reduce the total number of bits needed to signal the configuration of the OFDMA transmission that follows the UL OFDMA trigger frame.

Characteristics of RTS To Group transmitter are described below. One or more of the CTS copies might be transmitted. If the RTS to Group transmitter receives at least one CTS in response, then the MU PPDU may be transmitted as originally planned, to all intended recipients. Alternatively, the MU PPDU may be transmitted only to those intended recipients from which a respective CTS was received (e.g., the MU PPDU).

In one example, if the RTS to Group transmitter receives no CTS in response, then a normal retransmission procedure may be performed. It is possible that the RTS to group (e.g., RTSg, RTG, etc.) suffered interference at all intended recipient locations. In this situation, it may be likely that no CTS was transmitted.

It is also possible that multiple CTS were transmitted and interfered with each other. In this case, RTS transmitter might receive a better result if it changes the group of responding STAs. RTS transmitter can choose a modified group by changing GroupID, modifying Group membership and then transmitting again (e.g., after informing STAs of membership update), and/or changing AID range.

Random scrambler seed values will make each CTS transmission different (e.g., by using a CTS scrambler). In one example, in order to correctly be combined and received at the recipient location, each CTS needs to be bit-for-bit identical. It is possible that significant receive power levels would allow any single CTS to be received, even if all CTS are different from each other, but the reception probability is increased if all CTS are the same. Therefore, each CTS transmitter uses the scrambler initialization value from the received RTS to group frame. This ensures that all CTS on the air are identical bit streams. Alternatively, as described with reference to FIG. 5B, a CTS may alternatively include a TA therein to indicate from which intended recipient of the RTG the given CTS is received.

With respect to CTS Rate/Modulation Coding Set (MCS) and format, note that the CTS may be implemented to follow normal response rules for MCS/Rate determination (e.g., use highest BSS Basic rate that is less than or equal to the RTG rate). The CTS may also be implemented to follow normal response rules for PPDU format determination (e.g., use same PPDU format as RTG).

CTS follows a different rule for bandwidth and channel: Bandwidth and channel of each CTS is dictated by RTG information.

Alternatively, the RTS specifies a duration value for the CTS response. Depending upon (frequency, sub-carriers, spatial diversity, etc.) allocation, each user determines an appropriate MCS to use to match the given duration.

With respect to PLCP Protocol Data Unit (PPDU) Format, the RTS to group (RTG) and CTS response can both use legacy PPDU format. Note that new information may be carried in the RA field of the RTS to group (RTG), but this information is transparent to legacy devices. The RTS to group (RTG) and CTS response can be sent using other formats as well. Legacy MAC DUR field protection is not available to devices that cannot decode the PPDU format correctly.

With respect to CTS for Spatial Reuse, a CTS response could be individualized to allow spatial reuse (e.g., each CTS transmitter sends a unique CTS in response to the RTS to group) as per the option indicated above as opposed to all CTS PPDUs transmitted on all channels matching the RTS channelization.

Each responder needs to know which channel to use for the response. The GroupID identifier can be used to provide channel assignments. The GroupID information may be communicated separately from the RTS-CTS exchange and expected to be quasi-static. The GroupID information includes membership list and channel assignment per member.

Each unique CTS would contain an RA structure similar to the RTS to group RA structure (e.g., a group RA value), except that instead of AID range or group information, the CTS RA field lower 24 bits contains: Spatial reuse information (e.g., e.g. current level of interference) and/or responder identifier information (e.g. AID or partial AID). Alternatively, each CTS could be a new PPDU (e.g., not a CTS, but spatial reuse (SR) CTS (SRCTS)).

A Spatial Reuse (SR) CTS (SRCTS) may be used in certain examples. A SRCTS frame may have a type and subtype that uniquely identify it as different from the normal CTS frame. The RA field of such a SRCTS may be implemented as a normal RA value so as to prevent SRCTS confusion.

The following additional fields may be present in such a SRCTS:

1. INTF field: Current or average interference level at SRCTS transmitter location (e.g., number of dB of interference above a baseline value). The baseline value can be a previously agreed upon value (e.g., e.g. −95 dBm) or simply the noise floor determined by the SRCTS transmitter. Also, the interference level may simply represent a number of dB of expected impairment or interference over the baseline value. The baseline value could be a long term average established by the SRCTS transmitter.

2. Duration value (DUR)—time duration when the expected interference level is valid. This is the expected duration of the indicated interference level, for example, if an overlapping reception is occurring at the CTS transmitter location, then this field could contain the duration of time during which that interference level is expected to be experienced based on the duration of the ongoing reception indicated in the overlapping PPDU, e.g. inside of the PHY header of the interfering PPDU.

Such a SRCTS may additionally contain another field such as follows:

3. STAID=Address information of the SRCTS transmitter. For example, this can include some number of bits of AID. This allows the SRCTS transmitter to be uniquely identified by RA+AID combination by $3^{rd}$ party STAB (e.g., full 48-bit address of the SRCTS transmitter).

The SRCTS may be variable in length, and any such additional length can contain additional information. A length field can be included, or one of the subfields of the SRCTS may contain an extension bit that indicates that additional bytes are present (e.g., MSBit of INTF field (e.g., INTF[7]) is converted to an extension bit and the interference value is contained in INTF[6:0]).

The following FIG. 6C and FIG. 6D shows possible formats for such a new SRCTS frame type.

FIG. 6C is a diagram illustrating an example 603 of at least a portion of spatial reuse (SR) CTS (SRCTS) based frame with STAID (Address information of the SRCTS transmitter) field included.

FIG. 6D is a diagram illustrating an example 604 of at least a portion of spatial reuse (SR) CTS (SRCTS) based frame with no STAID field included.

The CTS or spatial reuse (SR) CTS (SRCTS) PLCP Protocol Data Unit (PPDU) format may include a Legacy PPDU. The Legacy PPDU could be used and provides protection against legacy third party STAs. Non-legacy PPDU format could be used and still provides MAC duration field information to protect against third party STAs that are capable of decoding it. Legacy PPDU needs to match existing tone allocations in frequency plan for the group identified by the GroupID (e.g., 20 MHz PPDU, Duplicate non-HT PPDU format, quad non-HT PPDU format, etc.).

In some examples, the CTS or SRCTS recipient must be capable of receiving multiple CTS or SRCTS simultaneously. In other examples, such a CTS or SRCTS may be implemented for use in a single user (SU) case in which a CTS or SRCTS recipient receives only one CTS or SRCTS at a time.

FIG. 6E is a diagram illustrating an example 605 of clear to send (CTS) for spatial reuse (SR) exchange. The RTS to group (RTG) transmitter (e.g., the STA receiving the multiple unique CTS or SRCTS) may be configured to perform various operations simultaneously. The RTG transmitter may be configured to determine which recipients have responded with a CTS or SRCTS. The RTG transmitter may be configured to determine which recipients to transmit DATA frame to, and on what tone allocation/channel mapping (e.g., if responder A did not respond on channel 3, then the RTG transmitter does not send data to that recipient on that same channel 3). The RTG transmitter may be configured to determine appropriate rate/MCS for transmission. Note that rate for each user portion can be different. Note also that some CTS might arrive with interference conditions that cannot be met, so no DATA frame transmission is possible to that CTS responder (e.g., such as shown on channel (CH) 3, for STA 3, etc.).

An example of Rate/MCS Selection for Data PPDU is provided below. The RTG transmitter STAg receives a unique CTS from STAn on channel x. The receive power of the CTS from STAn is −70 dBm. CTS RA field information indicates an interference level of +10 dB above noise. Noise floor is −95 dBm, previously communicated pseudo-static information. STAg TX power is +4 dB above STAn TX power, previously communicated pseudo-static information. STAg chooses a rate that will yield a packet error rate of P % based on expected PER at SINR of −70+4−(−95+10)=19 dB. Note that P % is error rate of STAg choice, e.g. 10%. Signal to interference noise ratio (SINR) to packet error rate (PER)/frame error rate (FER) is determined through pre-computed performance of modulation technique and expected channel conditions combined with packet length in bits and any coding gain. If no rate meets the conditions, then the STAg does not transmit.

An alternate PPDU Format for CTS is presented below. The CTS or SRCTS PPDU could potentially be a mixed legacy PPDU and the developing IEEE 802.11ax PPDU (e.g., legacy PHY header fields and legacy PHY payload followed immediately by new format PHY header fields and new format PHY payload).

This can include following fields in sequence: Legacy short training, Legacy long training, Legacy signal field, Legacy payload symbols, New format (e.g., HE aka TGax aka 11ax) training fields, New format signal field(s) (e.g., sigA+sigB), and/or New format payload symbols.

An alternate RTS to Group MAC (media access control) data protocol unit (MPDU) Format is presented below. A wireless communication device may be configured to create a new control subtype (e.g., Frame Control subfield TYPE=Control, SUBTYPE=RTG, and/or RTG=RTS To Group—a new subtype of MPDU).

An example of RTG format may be as follows: FC as in existing RTS format—2 bytes; DUR as in existing RTS format—2 bytes; RA as in existing RTS format—6 bytes (e.g., except that the RA value will contain the RTG transmitter 48-bit address); LNG=Length field, indicating the number of fields and bytes in the RTG which follow the Length field (e.g., either including or not including the 4-byte FCS field); ALLOC=Allocation field containing any of: (a) Group ID value (e.g., which identifies a group of STA). The Group ID value may also identify frequency resource allocations per STA. Frequency resource allocations per STA may be indicated in the Responder field, and (b) A list of STA ID values to identify a set of STAs, plus accompany per-STA frequency resource allocation information and may contain MCS and TX power information.

FIG. 7A is a diagram illustrating an example 701 of request to send (RTS) to group based MAC (media access control) data protocol unit (MPDU) format. This shows a request to send (RTS) to group format (e.g., RTSg, RTG, etc.) format diagram. In one example, LNG[6:0]=Nx4 or 1. If LNG[6:0]=1, then ALLOC has GroupID format. Alternatively, if LNG[6:0]>3, ALLOC has RSP format, LNG=total bytes of all ALLOC fields. LNG[7] signals whether a trigger field is present or not (e.g., as described below).

FIG. 7B is a diagram illustrating an example 702 of response (RSP) format of an allocation (ALLOC) field within a RTS to group based MPDU format.

FIG. 7C is a diagram illustrating an example 703 Group Identification (GroupID). In one example, this is based on a previously received Group Definition or Group Definition Field. This shows an example of GroupID format of ALLOC field.

The frequency allocation (FA) subfield contains frequency allocation information (e.g., a bitmap of frequency allocation quanta with a bit set to indicate that each corresponding quanta is allocated to this user). The modulation coding set (MCS) subfield contains the MCS to be used by this user in its allocation. The RTG field (e.g., alternatively RTSg, etc.) may also contain additional trigger information for a subsequent uplink OFDMA transmission (e.g., as described below). If this is true, then LNG [7]=1 to indicate that the additional trigger information is present. The size of additional trigger information specified within the additional trigger information.

FIG. 7D is a diagram illustrating an example 704 of a RTS to Group (e.g., RTSg, RTG, etc.) including a trigger field. This shows RTG with trigger field present. Note that the value of M depends on exact bit counts of fields in the TRIG field.

An alternate RTS to Group MPDU Format is presented below.

FIG. 7E is a diagram illustrating another example 705 of request to send (RTS) to group based MAC (media access control) data protocol unit (MPDU) format. The RTS to Group (RTG) frame may also contain any of the following:

a. OFDMA allocations for a subsequent transmission (e.g., an uplink OFDMA Trigger frame structure)

b. OFDMA allocations for a subsequent transmission do not need to match the OFDMA allocations for the CTS responses In the diagram, RED PPDUs are transmitted by one STA, potentially as OFDMA. BLUE PPDUs are transmitted by N users simultaneously as OFDMA.

Trigger information is similar to CTS/SRCTS allocation information, containing per user information for a subsequent MU OFDMA PPDU as follows:

a. User identifier (e.g., AID value)

b. Frequency allocation (FA) per user (e.g., expressed as a bitmap of quantized allocations)

c. TXPWR per user (e.g., a transmit power value for this user)

d. MCS may be included per user

Trigger information contains some common information:

a. PDDR—common to all users. The exact amount of time allocated for the PPDU that is being triggered.

b. Combined length of trigger information fields. The length information of the total amount of trigger information included. Since number of users is variable, length of entire set of trigger information will be variable.

Note that the examples of bit and byte allocations per field as described herein are examples, and other bit and byte allocations per field (e.g., more or fewer bits and/or bytes allocated per field) may be used in other examples without departing from the scope and spirit of the invention.

Figure 8B:
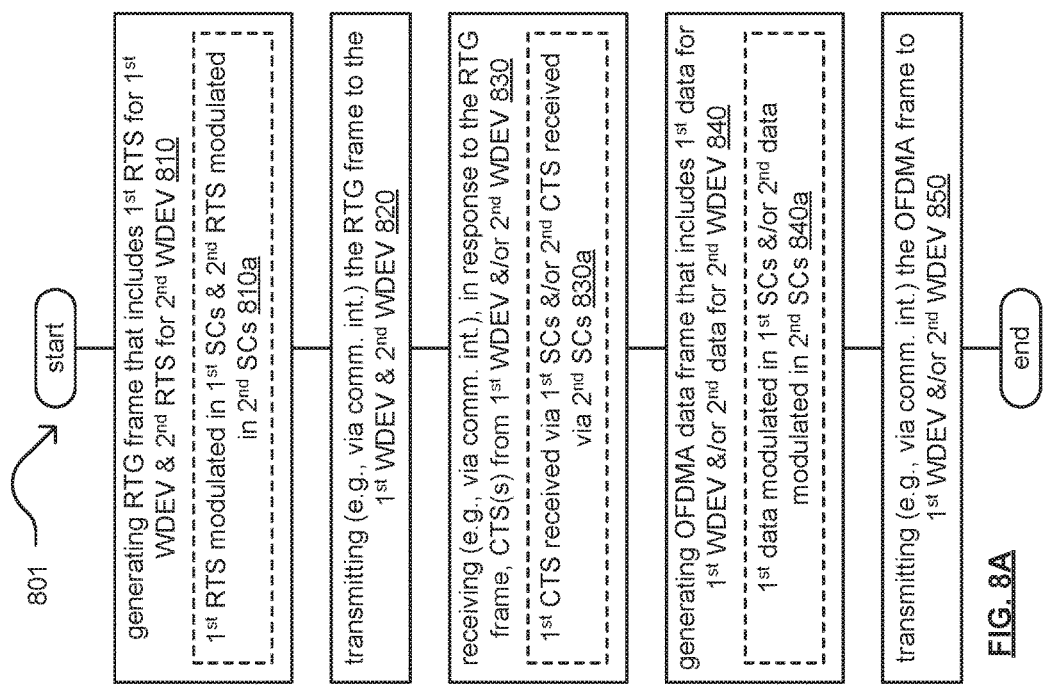
FIG. 8B is a diagram illustrating another embodiment of a method for execution by at least one wireless communication device.
Figure 8A:
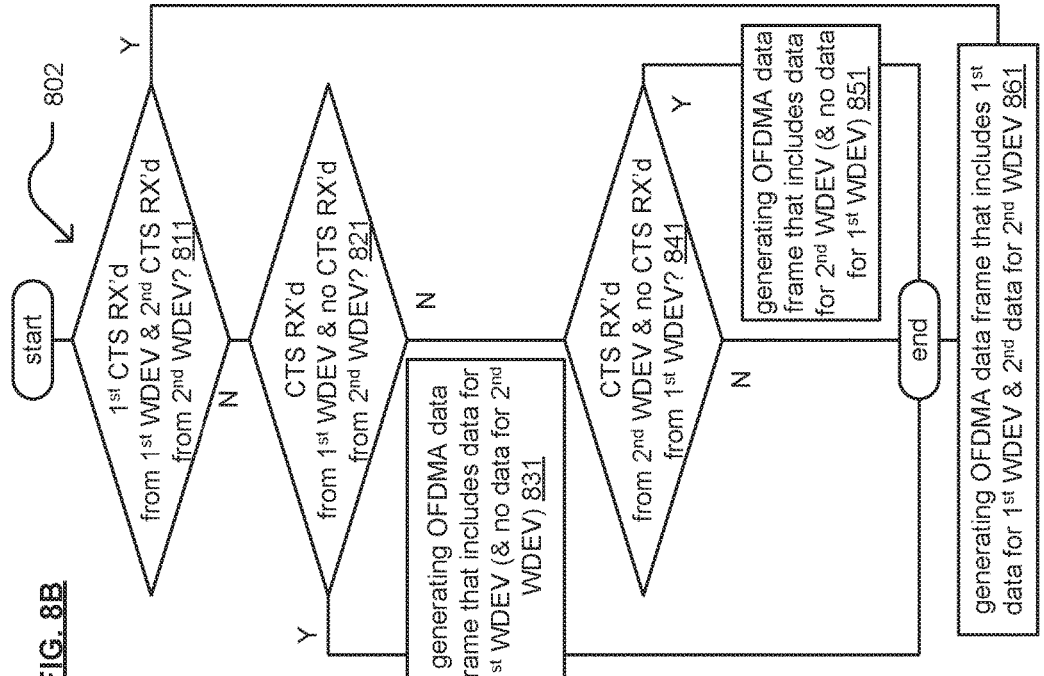
FIG. 8A is a diagram illustrating an embodiment of a method for execution by at least one wireless communication device.

FIG. 8A is a diagram illustrating an embodiment of a method 801 for execution by one or more wireless communication devices. The method 801 begins by generating a RTG frame that includes a first RTS intended for a first other wireless communication device and a second RTS intended for a second other wireless communication device (block 810). In some examples, the first RTS intended for a first other wireless communication device that is modulated within a first sub-channel of a communication channel, and the second RTS intended for a second other wireless communication device that is modulated within a second sub-channel of the communication channel (block 810*a*).

The method 801 continues by transmitting (e.g., via a communication interface of the wireless communication device) the RTG frame to the first other wireless communication device and the second other wireless communication device (block 820). The method 801 then operates by receiving, in response to the RTG frame (e.g., via the communication interface of the wireless communication device) at least one clear to send (CTS) from the first other wireless communication device and/or the second other wireless communication device (block 830). In some examples, the method 801 continues by receiving, in response to the RTG frame, a first CTS from the first other wireless communication device that is modulated within the first sub-channel of the communication channel and/or a second CTS from the second other wireless communication device that is modulated within the second sub-channel of the communication channel (block 830*a*).

The method 801 then operates by generating an orthogonal frequency division multiple access (OFDMA) data frame that includes first data intended for the first other wireless communication device and/or second data intended for the second other wireless communication device (block 840). In some examples, the OFDMA frame includes first data intended for the first other wireless communication device that is modulated within the first sub-channel of the communication channel and/or second data intended for the second other wireless communication device that is modulated within the second sub-channel of the communication channel (block 840*a*).

The method 801 continues by transmitting (e.g., via the communication interface of the wireless communication device) the OFDMA data frame to the first other wireless communication device and/or the second other wireless communication device (block 850).

FIG. 8B is a diagram illustrating another embodiment of a method 802 for execution by one or more wireless communication devices. The method 802 may be viewed as occurring after having transmitted a RTG frame a first other wireless communication device and a second other wireless communication device.

The method 802 operates by determining if a first CTS has been received from the first other wireless communication device and a second CTS has been received a second other wireless communication device (block 811). If yes (block 811), the method 802 continues by generating an OFDMA data frame that includes first data intended for the first other wireless communication device and second data intended for the second other wireless communication device (block 821). Alternatively, if no is determined (block 811), the method 802 operates by determining if a first CTS has been received from the first other wireless communication device and no second CTS has been received from the second other wireless communication device (block 821). If yes (block 821), then the method 802 continues by generating an OFDMA data frame that includes data intended for the first other wireless communication device and excludes any data intended for the second other wireless communication device (block 831).

Alternatively, if no is determined (block 821), the method 802 operates by determining if a second CTS has been received from the second other wireless communication device and no second CTS has been received from the first other wireless communication device (block 841). If yes (block 841), then the method 802 continues by generating an OFDMA data frame that includes data intended for the second other wireless communication device and excludes any data intended for the first other wireless communication device (block 851). Alternatively, if no is determined (block 841), the method 802 ends without transmitting data to either the first other wireless communication device or the second other wireless communication device.

It is noted that the various operations and functions described within various methods herein may be performed within a wireless communication device (e.g., such as by the processing circuitry 330, communication interface 320, and memory 340 or processing circuitry 330*a* such as described with reference to FIG. 2B) and/or other components therein. Generally, a communication interface and processing circuitry in a wireless communication device can perform such operations.

Examples of some components may include one of more baseband processing modules, one or more media access control (MAC) layer components, one or more physical layer (PHY) components, and/or other components, etc. For example, such a processing circuitry can perform baseband processing operations and can operate in conjunction with a radio, analog front end (AFE), etc. The processing circuitry can generate such signals, packets, frames, and/or equivalents etc. as described herein as well as perform various operations described herein and/or their respective equivalents.

In some embodiments, such a baseband processing module and/or a processing module (which may be implemented in the same device or separate devices) can perform such processing to generate signals for transmission to another wireless communication device using any number of radios and antennae. In some embodiments, such processing is performed cooperatively by a processing circuitry in a first device and another processing circuitry within a second device. In other embodiments, such processing is performed wholly by a processing circuitry within one device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to," "operably coupled to," "coupled to," and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to," "operable to," "coupled to," or "operably coupled to" indicates that an item includes one or more of power connections, input(s), output(s), etc., to perform, when activated, one or more its corresponding functions and may further include inferred coupling to one or more other items. As may still further be used herein, the term "associated with," includes direct and/or indirect coupling of separate items and/or one item being embedded within another item.

As may be used herein, the term "compares favorably" or equivalent, indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module," "processing circuit," "processor," and/or "processing unit" or their equivalents may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments of an invention have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processing circuitries, processors executing appropriate software and the like or any combination thereof.

The one or more embodiments are used herein to illustrate one or more aspects, one or more features, one or more concepts, and/or one or more examples of the invention. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module includes a processing module, a processor, a functional block, a processing circuitry, hardware, and/or memory that stores operational instructions for performing one or more functions as may be described herein. Note that, if the module is implemented via hardware, the hardware may operate independently and/or in conjunction with software and/or firmware. As also used herein, a module may contain one or more sub-modules, each of which may be one or more modules.

While particular combinations of various functions and features of the one or more embodiments have been expressly described herein, other combinations of these features and functions are likewise possible. The present disclosure of an invention is not limited by the particular examples disclosed herein and expressly incorporates these other combinations.

What is claimed is:

1. A wireless communication device comprising:
a communication interface; and
processing circuitry that is coupled to the communication interface, wherein at least one of the communication interface or the processing circuitry configured to:
generate a request to send (RTS) to group (RTG) frame that includes a first RTS intended for a first other wireless communication device that is modulated within a first sub-channel that includes a first subset of orthogonal frequency division multiple access (OFDMA) sub-carriers of a communication channel and a second RTS intended for a second other wireless communication device that is modulated within a second sub-channel that includes a second subset of OFDMA sub-carriers of the communication channel;

transmit the RTG frame to the first other wireless communication device and the second other wireless communication device;

receive, in response to the RTG frame, at least one clear to send (CTS) from at least one of the first other wireless communication device or the second other wireless communication device;

generate an OFDMA data frame that includes at least one of first data intended for the first other wireless communication device or second data intended for the second other wireless communication device; and transmit the OFDMA data frame to at least one of the first other wireless communication device or the second other wireless communication device; and wherein:

the OFDMA data frame includes the first data intended for the first other wireless communication device and excludes the second data intended for the second other wireless communication device when a CTS is received from the first other wireless communication device and no CTS is received from the second other wireless communication device; and the OFDMA data frame excludes the first data intended for the first other wireless communication device and includes the second data intended for the second other wireless communication device when another CTS is received from the second other wireless communication device and no CTS is received from the first other wireless communication device.

2. The wireless communication device of claim 1 further comprising:

at least one of a laptop computer, a tablet, a personal digital assistant, personal computer, or a cellular telephone.

3. The wireless communication device of claim 1, wherein:

the RTG frame includes addressing information that specifies the RTG frame is intended for the first other wireless communication device and the second other wireless communication device including at least one of an Organisationally Unique Identifier (OUI), a group identification field (group ID), or an association ID (AID); and the addressing information also specifies at least one of frequency resource allocation for the first other wireless communication device and the second other wireless communication device, modulation coding set (MCS) information for use by the first other wireless communication device and the second other wireless communication device, or transmit power information for use by the first other wireless communication device and the second other wireless communication device.

4. The wireless communication device of claim 1, wherein the at least one of the communication interface or the processing circuitry is further configured to perform at least one of:

receive, in response to the RTG frame, a first CTS from the first other wireless communication device that is modulated within the first sub-channel that includes the first subset of OFDMA sub-carriers of the communication channel; or receive, in response to the RTG frame, a second CTS from the second other wireless communication device that is modulated within the second sub-channel that includes the second subset of OFDMA sub-carriers of the communication channel.

5. The wireless communication device of claim 1, wherein the RTG frame includes at least one of a frame control (FC) field, a duration (DUR) field, a receiver address (RA) field, a length (LNG) field, or an allocation (ALLOC) field.

6. The wireless communication device of claim 1 further comprising:

the communication interface configured to support communications within at least one of a satellite communication system, a wireless communication system, a wired communication system, a fiber-optic communication system, or a mobile communication system; and the processing circuitry configured to transmit the RTG frame and the OFDMA data frame and to receive the at least one CTS via the communication interface.

7. The wireless communication device of claim 1 further comprising:

a wireless station (STA), wherein at least one of the first other wireless communication device or the second other wireless communication device includes an access point (AP).

8. The wireless communication device of claim 1 further comprising:

an access point (AP), wherein at least one of the first other wireless communication device or the second other wireless communication device includes a wireless station (STA).

9. A wireless communication device comprising:

a communication interface; and processing circuitry that is coupled to the communication interface, wherein at least one of the communication interface or the processing circuitry configured to:

generate a request to send (RTS) to group (RTG) frame that includes a first RTS intended for a first other wireless communication device that is modulated within a first sub-channel that includes a first subset of orthogonal frequency division multiple access (OFDMA) sub-carriers of a communication channel and a second RTS intended for a second other wireless communication device that is modulated within a second sub-channel that includes a second subset of OFDMA sub-carriers of the communication channel, wherein the RTG frame includes addressing information that specifies the RTG frame is intended for the first other wireless communication device and the second other wireless communication device including at least one of an Organisationally Unique Identifier (OUI), a group identification field (group ID), or an association ID (AID);

transmit the RTG frame to the first other wireless communication device and the second other wireless communication device;

receive, in response to the RTG frame, at least one of a first clear to send (CTS) from the first other wireless communication device received via the first sub-channel that includes the first subset of OFDMA sub-carriers of the communication channel or a second CTS from the second other wireless communication device via the second sub-channel that includes the second subset of OFDMA sub-carriers of the communication channel;

generate an OFDMA data frame that includes at least one of first data intended for the first other wireless communication device that is modulated within the first sub-channel that includes the first subset of OFDMA sub-carriers of the communication channel or second data intended for the second other wireless communication device that is modulated within the second sub-channel that includes the second subset of OFDMA sub-carriers of the communication channel; and transmit the OFDMA data frame to at least one of the first other wireless communication device or the second other wireless communication device; and wherein:
the OFDMA data frame includes the first data intended for the first other wireless communication device and excludes the second data intended for the second other wireless communication device when a CTS is received from the first other wireless communication device and no CTS is received from the second other wireless communication device; and the OFDMA data frame excludes the first data intended for the first other wireless communication device and includes the second data intended for the second other wireless communication device when another CTS is received from the second other wireless communication device and no CTS is received from the first other wireless communication device.

10. The wireless communication device of claim 9 further comprising:
at least one of a laptop computer, a tablet, a personal digital assistant, personal computer, or a cellular telephone.

11. The wireless communication device of claim 9, wherein:
the addressing information also specifies at least one of frequency resource allocation for the first other wireless communication device and the second other wireless communication device, modulation coding set (MCS) information for use by the first other wireless communication device and the second other wireless communication device, or transmit power information for use by the first other wireless communication device and the second other wireless communication device; and the RTG frame also includes at least one of a frame control (FC) field, a duration (DUR) field, a receiver address (RA) field, a length (LNG) field, or an allocation (ALLOC) field.

12. The wireless communication device of claim 9 further comprising:
the communication interface configured to support communications within at least one of a satellite communication system, a wireless communication system, a wired communication system, a fiber-optic communication system, or a mobile communication system; and the processing circuitry configured to transmit the RTG frame and the OFDMA data frame and to receive the at least one CTS via the communication interface.

13. The wireless communication device of claim 9 further comprising:
an access point (AP), wherein at least one of the first other wireless communication device or the second other wireless communication device includes a wireless station (STA).

14. A method for execution by a wireless communication device, the method comprising:
generating a request to send (RTS) to group (RTG) frame that includes a first RTS intended for a first other wireless communication device that is modulated within a first sub-channel that includes a first subset of orthogonal frequency division multiple access (OFDMA) sub-carriers of a communication channel and a second RTS intended for a second other wireless communication device that is modulated within a second sub-channel that includes a second subset of OFDMA sub-carriers of the communication channel;

transmitting, via a communication interface of the wireless communication device, the RTG frame to the first other wireless communication device and the second other wireless communication device;

receiving, in response to the RTG frame and via the communication interface of the wireless communication device, at least one clear to send (CTS) from at least one of the first other wireless communication device or the second other wireless communication device;

generating an OFDMA data frame that includes at least one of first data intended for the first other wireless communication device or second data intended for the second other wireless communication device; and transmitting, via the communication interface of the wireless communication device, the OFDMA data frame to at least one of the first other wireless communication device or the second other wireless communication device; and wherein:

the OFDMA data frame includes the first data intended for the first other wireless communication device and excludes the second data intended for the second other wireless communication device when a CTS is received from the first other wireless communication device and no CTS is received from the second other wireless communication device; and the OFDMA data frame excludes the first data intended for the first other wireless communication device and includes the second data intended for the second other wireless communication device when another CTS is received from the second other wireless communication device and no CTS is received from the first other wireless communication device.

15. The method of claim 14, wherein the wireless communication device includes at least one of a laptop computer, a tablet, a personal digital assistant, personal computer, or a cellular telephone.

16. The method of claim 14, wherein:
the RTG frame includes addressing information that specifies the RTG frame is intended for the first other wireless communication device and the second other wireless communication device including at least one of an Organisationally Unique Identifier (OUI), a group identification field (group ID), or an association ID (AID); and the addressing information also specifies at least one of frequency resource allocation for the first other wireless communication device and the second other wireless communication device, modulation coding set (MCS) information for use by the first other wireless communication device and the second other wireless communication device, or transmit power information for use by the first other wireless communication device and the second other wireless communication device.

17. The method of claim 14 further comprising at least one of:
- receiving, in response to the RTG frame and via the communication interface of the wireless communication device, a first CTS from the first other wireless communication device that is modulated within the first sub-channel that includes the first subset of OFDMA sub-carriers of the communication channel; or
- receiving, in response to the RTG frame and via the communication interface of the wireless communication device, a second CTS from the second other wireless communication device that is modulated within the second sub-channel that includes a second subset of OFDMA sub-carriers of the communication channel.

18. The method of claim 14, wherein the RTG frame includes at least one of a frame control (FC) field, a duration (DUR) field, a receiver address (RA) field, a length (LNG) field, or an allocation (ALLOC) field.

19. The method of claim 14, wherein the wireless communication device includes a wireless station (STA), and at least one of the first other wireless communication device or the second other wireless communication device includes an access point (AP).

20. The method of claim 14, wherein the wireless communication device includes an access point (AP), and at least one of the first other wireless communication device or the second other wireless communication device includes a wireless station (STA).

\* \* \* \* \*